US012591626B2

(12) United States Patent
Green et al.

(10) Patent No.: US 12,591,626 B2
(45) Date of Patent: Mar. 31, 2026

(54) SEARCH STRING ENHANCEMENT

(71) Applicant: International Business Machines Corporation, Armonk, NY (US)

(72) Inventors: Sophie D. Green, Andover (GB); Stephen R.F. Head, Chandler's Ford (GB); Katherine Elizabeth Speight, Eastleigh (GB); Robert William John Parker, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 17/643,239

(22) Filed: Dec. 8, 2021

(65) Prior Publication Data

US 2023/0177093 A1 Jun. 8, 2023

(51) Int. Cl.
| | |
|---|---|
| *G06F 16/9532* | (2019.01) |
| *G06F 40/211* | (2020.01) |
| *G06F 40/253* | (2020.01) |
| *G06F 40/40* | (2020.01) |

(52) U.S. Cl.
CPC ........ *G06F 16/9532* (2019.01); *G06F 40/211* (2020.01); *G06F 40/253* (2020.01); *G06F 40/40* (2020.01)

(58) Field of Classification Search
CPC .. G06F 16/9532; G06F 40/211; G06F 40/253; G06F 40/40
See application file for complete search history.

(56) References Cited

U.S. PATENT DOCUMENTS

| | | | | |
|---|---|---|---|---|
| 2002/0194230 | A1* | 12/2002 | Polanyi | G06F 40/289 |
| | | | | 707/E17.094 |
| 2004/0199498 | A1* | 10/2004 | Kapur | G06F 16/951 |
| 2005/0060140 | A1* | 3/2005 | Maddox | G06F 40/30 |
| | | | | 704/4 |
| 2006/0161520 | A1* | 7/2006 | Brewer | G06F 16/3322 |
| 2009/0055386 | A1* | 2/2009 | Boss | G06F 16/3338 |
| | | | | 707/999.005 |
| 2014/0149399 | A1* | 5/2014 | Kurzion | G06F 16/9535 |
| | | | | 707/765 |
| 2015/0149497 | A1* | 5/2015 | Kanjirathinkal | G06F 16/3325 |
| | | | | 707/765 |

(Continued)

FOREIGN PATENT DOCUMENTS

WO 2021025825 A1 2/2021

OTHER PUBLICATIONS

"Adjective order", https://dictionary.cambridge.org/us/grammar/british-grammar/adjectives-order, printed Sep. 9, 2021 5 pgs. (Year: 2021).*

(Continued)

*Primary Examiner* — Bhavesh M Mehta
*Assistant Examiner* — Philip H Lam
(74) *Attorney, Agent, or Firm* — Kimberly Zillig

(57) ABSTRACT

A computer-implemented method is used for determining an enhancement for a search string. The method includes, responsive to receiving an input search string comprising one or more search terms at an input field: identifying a type of each of the one or more search terms, determining an order of the types of the one or more search terms in the input search string, and determining an enhancement for the input search string based on the determined order of the types of the one or more search terms.

15 Claims, 7 Drawing Sheets

(56) References Cited

U.S. PATENT DOCUMENTS

| | | | | |
|---|---|---|---|---|
| 2015/0293996 | A1* | 10/2015 | Liu | G06F 16/739 |
| | | | | 707/723 |
| 2016/0140123 | A1* | 5/2016 | Chang | G06F 16/24522 |
| | | | | 707/760 |
| 2017/0242913 | A1* | 8/2017 | Tijssen | G06F 40/279 |
| 2017/0316383 | A1* | 11/2017 | Naganathan | G06Q 10/1095 |
| 2019/0370326 | A1* | 12/2019 | Andreica | G06F 40/211 |
| 2020/0218778 | A1* | 7/2020 | Abuelsaad | G06F 40/205 |
| 2020/0293591 | A1* | 9/2020 | Prelovac | G06F 16/9538 |
| 2021/0117482 | A1* | 4/2021 | Adachi | G06F 16/242 |
| 2022/0179892 | A1* | 6/2022 | Kermode | G06N 3/08 |
| 2022/0309428 | A1* | 9/2022 | Powers | G06N 20/00 |
| 2023/0070618 | A1* | 3/2023 | Mishra | G06F 40/205 |

OTHER PUBLICATIONS

Futrell, R., Dyer, W., & Scontras, G. (Jul. 2020). What determines the order of adjectives in English? Comparing efficiency-based theories using dependency treebanks. In Proceedings of the 58th annual meeting of the association for computational linguistics (pp. 2003-2012). (Year: 2020).*

"Adjectives: order," https://dictionary.cambridge.org/grammar/british-grammar/adjectives-order, printed Sep. 9, 2021, 5 pgs.

Google, "Refine web searches," https://support.google.com/websearch/answer/2466433?hl=en, printed Nov. 22, 2021, 2 ogs.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

SEARCH STRING ENHANCEMENT

BACKGROUND

The technical character of the present disclosure generally relates to the field of search engines/systems, and more particularly, systems and methods for search string enhancement in search engines/systems.

When searching the internet, users often want to search for specific objects. For example, a user may search for a "metal carving knife." If this is entered as a search string into a conventional search engine, the search engine will look for results that contain all three words, but it will not take into account the order of the terms within the string. Searching using the search strings "metal carving knife" and "metal knife carving" will typically provide very similar results.

However, the intention of the user may be different for each string. For the string "metal carving knife," the user is more likely looking for a metal knife used for carving; whereas, for the string "metal knife carving," the user is more likely looking for a carving made with a metal knife.

SUMMARY

Embodiments of the present disclosure include a computer-implemented method for determining an enhancement for a search string. The method includes, responsive to receiving an input search string comprising one or more search terms at an input field: identifying a type of each of the one or more search terms, determining an order of the types of the one or more search terms in the input search string, and determining an enhancement for the input search string based on the determined order of the types of the one or more search terms.

Additional embodiments of the present disclosure include a method for training a machine learning algorithm for determining an enhancement for an input search string. The method includes receiving: i) a training search string having multiple search terms and multiple search term types; and ii) a training enhancement for the training search string based on a predetermined order of the types of search terms. The method further includes training the machine learning algorithm based on the training search string as a training input for the machine learning algorithm and the training enhancement for the training search string as the training output for the machine learning algorithm.

Additional embodiments of the present disclosure include a computer program product for determining an enhancement for a search string, the computer program product comprising a computer readable storage medium having program instructions embodied therewith, the program instructions executable by a processing unit to cause the processing unit to perform a method. The method includes, responsive to receiving an input search string comprising one or more search terms at an input field: identifying a type of each of the one or more search terms, determining an order of the types of the one or more search terms in the input search string, and determining an enhancement for the input search string based on the determined order of the types of the one or more search terms.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1:
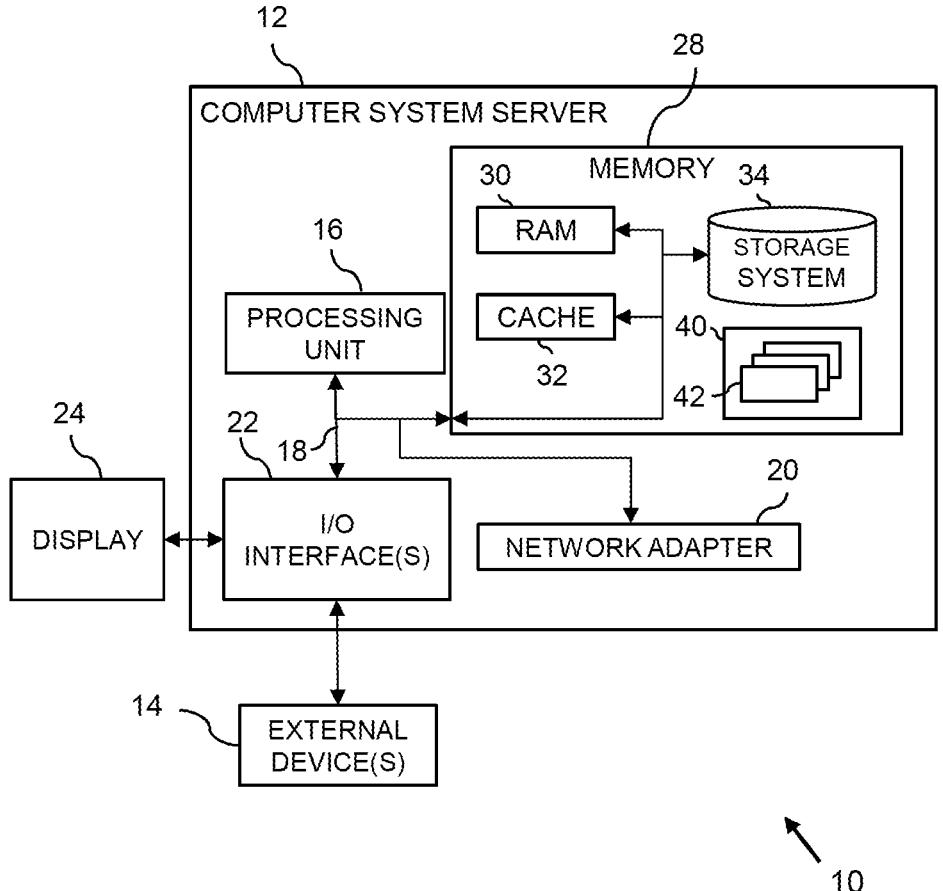
FIG. 1 depicts a cloud computing node, in accordance with embodiments of the present disclosure.

It should be understood that the Figures are merely schematic and are not drawn to scale. It should also be understood that the same reference numerals are used throughout the Figures to indicate the same or similar parts.

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present disclosure. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present disclosure.

As noted above, many conventional search engines do not take into account the order of terms within a search string. As a result, search strings written with different intentions typically provide very similar results.

It is possible to use rules to set exact matches for search strings or combine words to refine the results in current search engine optimization methods. However, one drawback of this solution, as it is employed currently, is the requirement for exact string matching in order to differentiate the search results. The requirement for exact string matching will often remove potentially valid results. For example, if the user were to search using the search string "Scottish carving knife" in a typical search engine that relied upon using exact string matching, the user would not see results for the string "old Scottish carving knife" because they would only see search results containing the exact string used for the search.

Embodiments of the present disclosure may address these and other drawbacks by providing a means of enhancing a search string without artificially limiting the search results returned to the user. In particular, the technical character of the present disclosure generally relates to search string enhancement, and more particularly, to determining search string enhancements based on a determined order of the types of the one or more search terms.

The present disclosure seeks to provide a method for determining an enhancement for a search string. The present disclosure also seeks to provide a method for training a machine learning algorithm for determining an enhancement for an input search string. Such methods may be computer-implemented. That is, such methods may be implemented in a computer infrastructure having computer executable code tangibly embodied on a computer readable storage medium having programming instructions configured to perform a proposed method. The present disclosure further seeks to provide a computer program product including computer program code for implementing the proposed concepts when executed on a processor. The present disclosure yet further seeks to provide a system for determining an enhancement for a search string. The disclosure also seeks to provide a system for training a machine learning algorithm for determining an enhancement for an input search string.

More specifically, embodiments of the present disclosure enable determining an enhancement for a search string. Such embodiments may include, responsive to receiving an input search string comprising one or more search terms at an input field: (i) identifying a type of each of the one or more search terms; (ii) determining an order of the types of the one or more search terms in the input search string; and (iii) determining an enhancement for the input search string based on the determined order of the types of the one or more search terms.

Therefore, embodiments of the present disclosure provide a means of automatically enhancing a search string provided by a user based on the ordering of different types of search terms in the input search string, thereby improving the search string and so improving the results received by the user. In other words, the present disclosure provides a means of determining an enhancement for a search string based on the ordering of the types of search terms present in the search string, meaning that the determined enhancement is more accurate to the specific search string.

It has been recognized that the ordering of the types of search terms in a search string is indicative of the intent of the user performing the search. Accordingly, the disclosure provides a means of determining an intent of the user providing the search string based on the ordering of the types of search terms in the search string and determining the enhancement for the search string based on the determined intent of the user. Thus, the method provides a means of enhancing the search string based on the intent of the user in order to obtain more relevant search results.

Thus, as discussed herein, analyzing the content of the search string before the search is performed enables determination of an optimal enhancement for the search string in order to return the most accurate and relevant results to the user.

In accordance with at least one embodiment of the present disclosure, the type of the one or more search terms comprises one or more of a noun and an adjective. In accordance with at least one embodiment of the present disclosure, responsive to identifying the types of one or more of the search terms as adjectives: a category of the one or more adjectives is identified; an order of the categories of the one or more adjectives in the input search string is determined; and an enhancement for the input search string based on the determined order of the categories of the one or more search terms is determined. Because the order of adjective categories can change the meaning of the input search string, by determining the enhancement for the search string based on the order of the adjectives, the accuracy of the search string, and the search results, may be improved.

In accordance with at least one embodiment of the present disclosure, the determined order of the categories of the one or more adjectives is compared to a grammatical rule and determining the enhancement for the input string is further based on the comparison. In this way, the intent of the user behind the input search string may be better understood when determining the enhancement to be provided to the search string.

In accordance with at least one embodiment of the present disclosure, responsive to the determined order of the categories of one or more adjectives not satisfying the grammatical rule, determining the enhancement for the input search string includes determining that no enhancement is required for the input search string.

In accordance with at least one embodiment of the present disclosure, responsive to the determined order of the categories of one or more adjectives not satisfying the grammatical rule, determining the enhancement for the input search string includes: (i) determining whether a part of the determined order of the categories of one or more adjectives satisfies the grammatical rule; (ii) for any part of the determined order of the categories of one or more adjectives that does satisfy the grammatical rule, grouping said one or more adjectives into a search group; and (iii) providing an AND operator between the search group and the remaining one or more adjectives. In this way, the quality of the search string may be automatically improved on the user's behalf.

In accordance with at least one embodiment of the present disclosure, responsive to the determined order of the categories of the one or more adjectives satisfying the grammatical rule, determining the enhancement for the input search string includes generating wildcard operators to be provided between the one or more adjectives. In this way, results including additional words between those of the input search string may also be returned by the search, thereby increasing the number of potential results returned by the search string.

In accordance with at least one embodiment of the present disclosure, if the input search string only comprises a noun, determining the enhancement for the input search string includes determining that no enhancement is required for the input search string. In this way, a simple search term for a noun can simply be searched without requiring further enhancement.

In accordance with at least one embodiment of the present disclosure, an enhanced search string based on the determined enhancement is generated. In accordance with at least one further embodiment of the present disclosure, the enhanced search string is provided to the input field. In this way, the enhanced search string may be provided to the input field automatically on the user's behalf.

In accordance with at least one embodiment of the present disclosure, a machine learning algorithm may perform the aforementioned operations. In accordance with at least one further embodiment of the present disclosure, the machine learning algorithm may include a natural language processing algorithm.

According to an aspect of the disclosure, there is provided a method for training a machine learning algorithm for determining an enhancement for an input search string. The method includes: receiving a training search string having multiple search terms and multiple search term types; receiving a training enhancement for the training search string based on the order of the types of search terms; and training the machine learning algorithm based on the training search string as a training input for the machine learning algorithm and the training enhancement for the training search string as the training output for the machine learning algorithm.

In accordance with at least one embodiment of the present disclosure, a further training search having multiple adjectives comprising multiple categories of adjective and a further training enhancement for the further training search string based on the order of the categories of the adjectives are received, and the machine learning algorithm is trained based on the further training search string as a training input for the machine learning algorithm and the further training enhancement for the training search string as the training output for the machine learning algorithm.

Embodiments may be employed in combination with conventional/existing search engines and/or searching systems. In this way, embodiments may integrate into legacy systems so as to improve and/or extend their functionality and capabilities. An improved search engine/system may therefore be provided by proposed embodiments.

According to an aspect of the disclosure, there is provided a computer program product for determining an enhancement for a search string. The computer program product includes a computer readable storage medium having program instructions embodied therewith. The program instructions are executable by a processing unit to cause the processing unit to perform a method. The method includes, responsive to receiving an input search string comprising one or more search terms at an input field: identifying a type of each of the one or more search terms; determining an order of the types of the one or more search terms in the input search string; and determining an enhancement for the input search string based on the determined order of the types of the one or more search terms.

According to a further aspect of the disclosure, there is provided a computer program product for training a machine learning algorithm for determining an enhancement for an input search string. The computer program product includes a computer readable storage medium having program instructions embodied therewith. The program instructions are executable by a processing unit to cause the processing unit to perform a method. The method includes receiving a training search string having multiple search terms and multiple search term types, receiving a training enhancement for the training search string based on the order of the types of search terms, and training the machine learning algorithm based on the training search string as a training input for the machine learning algorithm and the training enhancement for the training search string as the training output for the machine learning algorithm.

In accordance with at least one embodiment of the present disclosure, a further training search string having multiple adjectives comprising multiple categories of adjective and a further training enhancement for the further training search string based on the order of the categories of the adjectives are received, and the machine learning algorithm is trained based on the further training search string as a training input for the machine learning algorithm and the further training enhancement for the training search string as the training output for the machine learning algorithm.

According to an aspect of the disclosure, a processing system includes at least one processor and the computer program product described above. The at least one processor is adapted to execute the computer program code of said computer program product.

According to an aspect of the disclosure, there is provided a system for determining an enhancement for a search string.

The system includes a processor arrangement configured to perform, responsive to receiving an input search string at an input field: (i) an identification of a type of each of the one or more search terms; (ii) a determination of an order of the types of the one or more search terms in the input search string; and (iii) a determination of an enhancement for the input search string based on the determined order of the types of the one or more search terms.

According to a further aspect of the disclosure, there is provided a system for training a machine learning algorithm for determining an enhancement for an input search string. The system includes a processor arrangement configured to: receive a training search string having multiple search terms and multiple search term types; receive a training enhancement for the training search string based on the order of the types of search terms; and train the machine learning algorithm based on the training search string as a training input for the machine learning algorithm and the training enhancement for the training search string as the training output for the machine learning algorithm.

Thus, as discussed in further detail herein, the present disclosure enables automatically enhancing a search string provided by a user based on the ordering of different types of search terms in the input search string. For instance, embodiments of the present disclosure may enable a machine-learning algorithm to be trained to predict or suggest the most appropriate enhancement to an input search string based on the ordering of the search terms. Providing such automated search string enhancements may help to improve the search results obtained by the user, thereby improving the efficiency of a search engine.

It is to be understood that although this disclosure includes a detailed description on cloud computing, implementation of the techniques recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
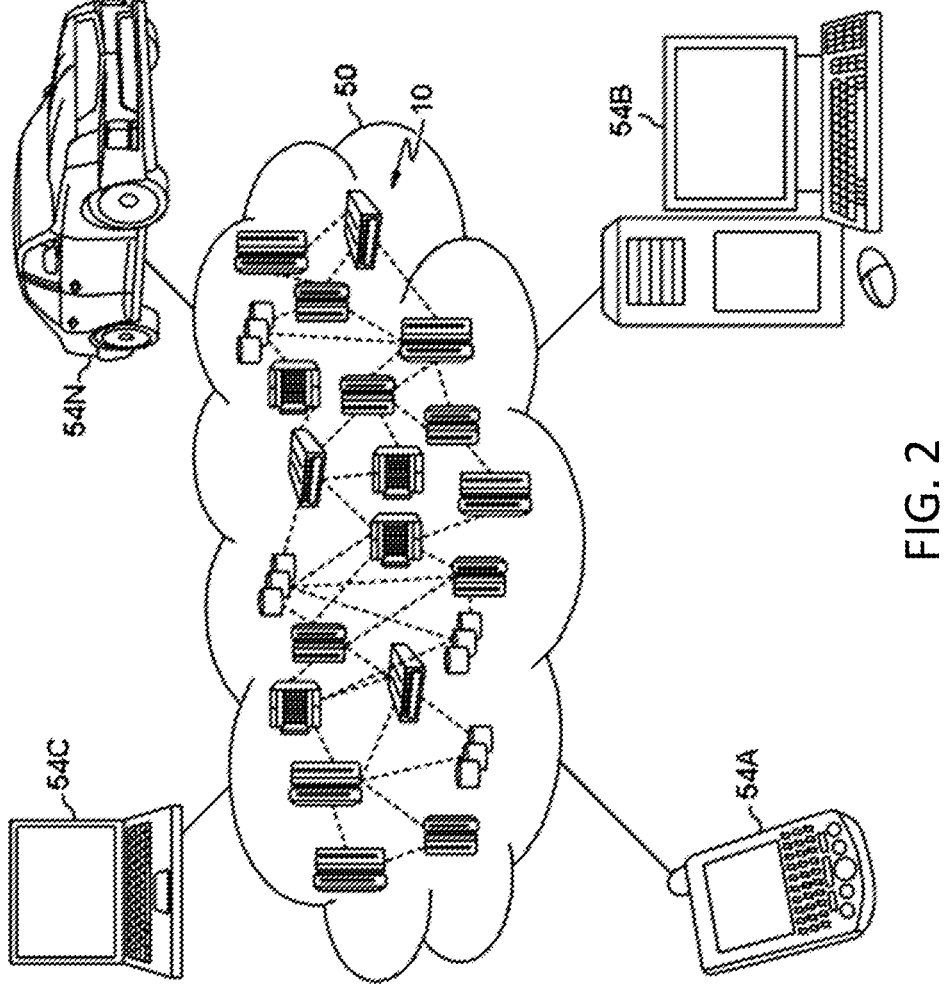
FIG. 2 depicts a cloud computing environment, in accordance with embodiments of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
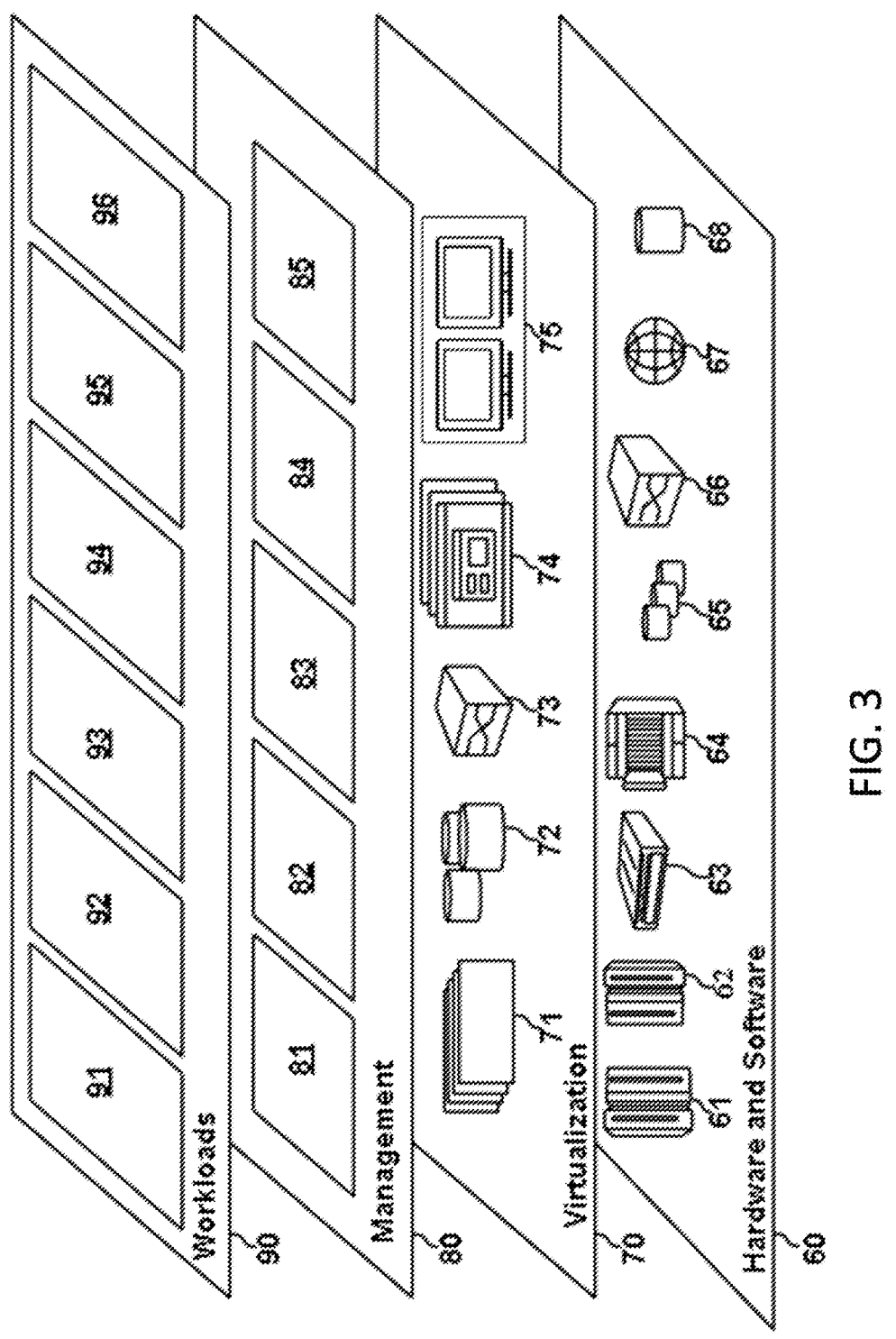
FIG. 3 depicts abstraction model layers, in accordance with embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and search string enhancement processes 96 described herein. In accordance with aspects of the disclosure, the search string enhancement processes 96 workload/function operates to perform one or more of the processes described herein.

Figure 4:
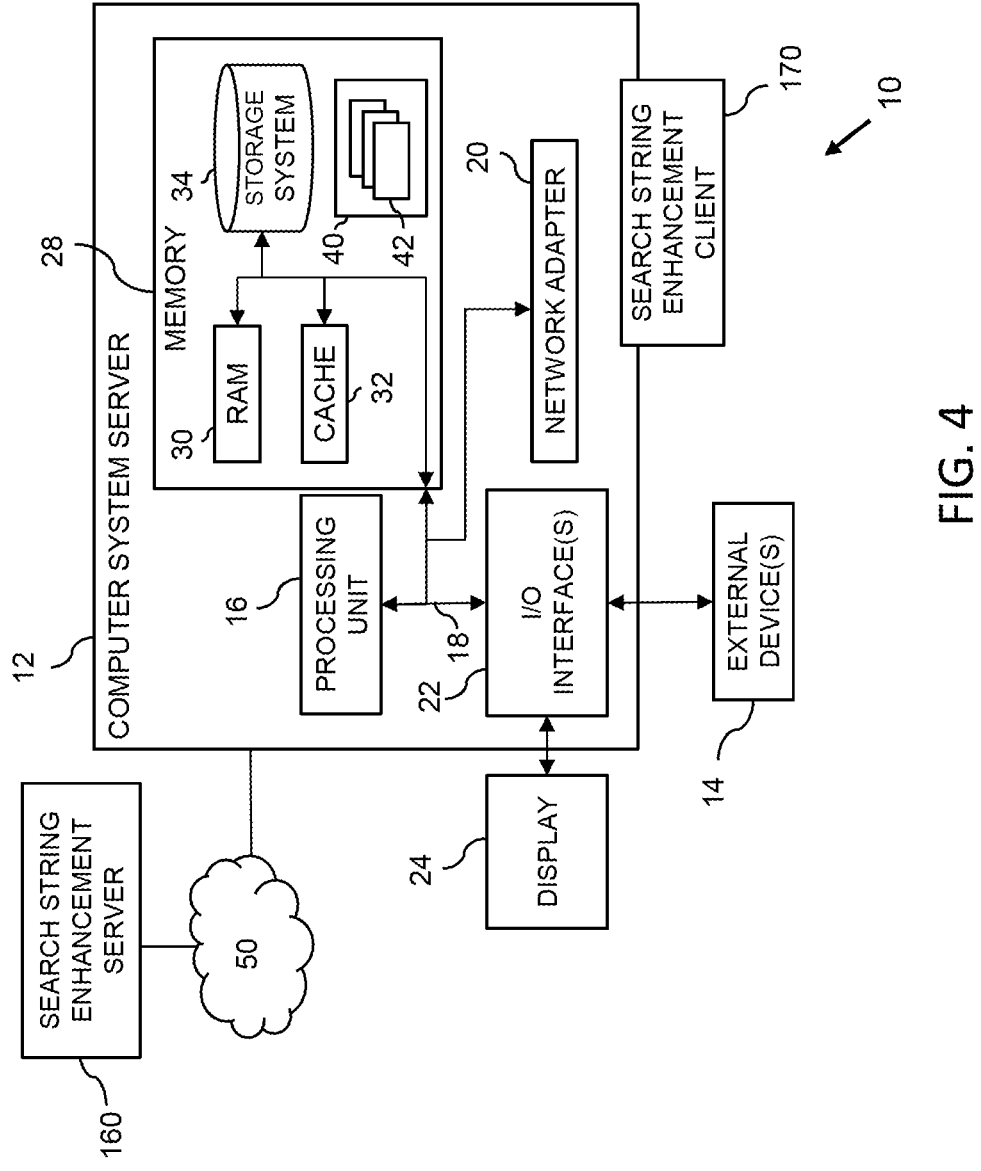
FIG. 4 depicts a cloud computing node, in accordance with embodiments of the present disclosure.

FIG. 4 depicts a cloud computing node according to another embodiment of the present disclosure. In particular, FIG. 4 is another cloud computing node which may be substantially similar to the cloud computing node 10 in FIG. 1. In FIG. 4, the computer system/server 12 also comprises or communicates with a search string enhancement client 170 and a search string enhancement server 160.

In accordance with aspects of the disclosure, the search string enhancement client 170 can be implemented as one or more program code in program modules 42 stored in memory as separate or combined modules. Additionally, the search string enhancement client 170 may be implemented as separate dedicated processors or a single or several processors to provide the function of these tools. While executing the computer program code, the processing unit 16 can read and/or write data to/from memory, storage system, and/or I/O interface 22. The program code executes the processes of the disclosure.

By way of example, search string enhancement client 170 may be configured to communicate with the search string enhancement server 160 via a cloud computing environment 50. As discussed with reference to FIG. 2, for example, cloud computing environment 50 may be the Internet, a local area network, a wide area network, and/or a wireless network. In embodiments of the proposed search string enhancement mechanism, the search string enhancement server 160 may provision data to the client 170. One of ordinary skill in the art would understand that the search string enhancement client 170 and search string enhancement n server 160 may communicate directly. Alternatively, a relay agent may be used as an intermediary to relay messages between search string enhancement client 170 and search string enhancement server 160 via the cloud computing environment 50.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
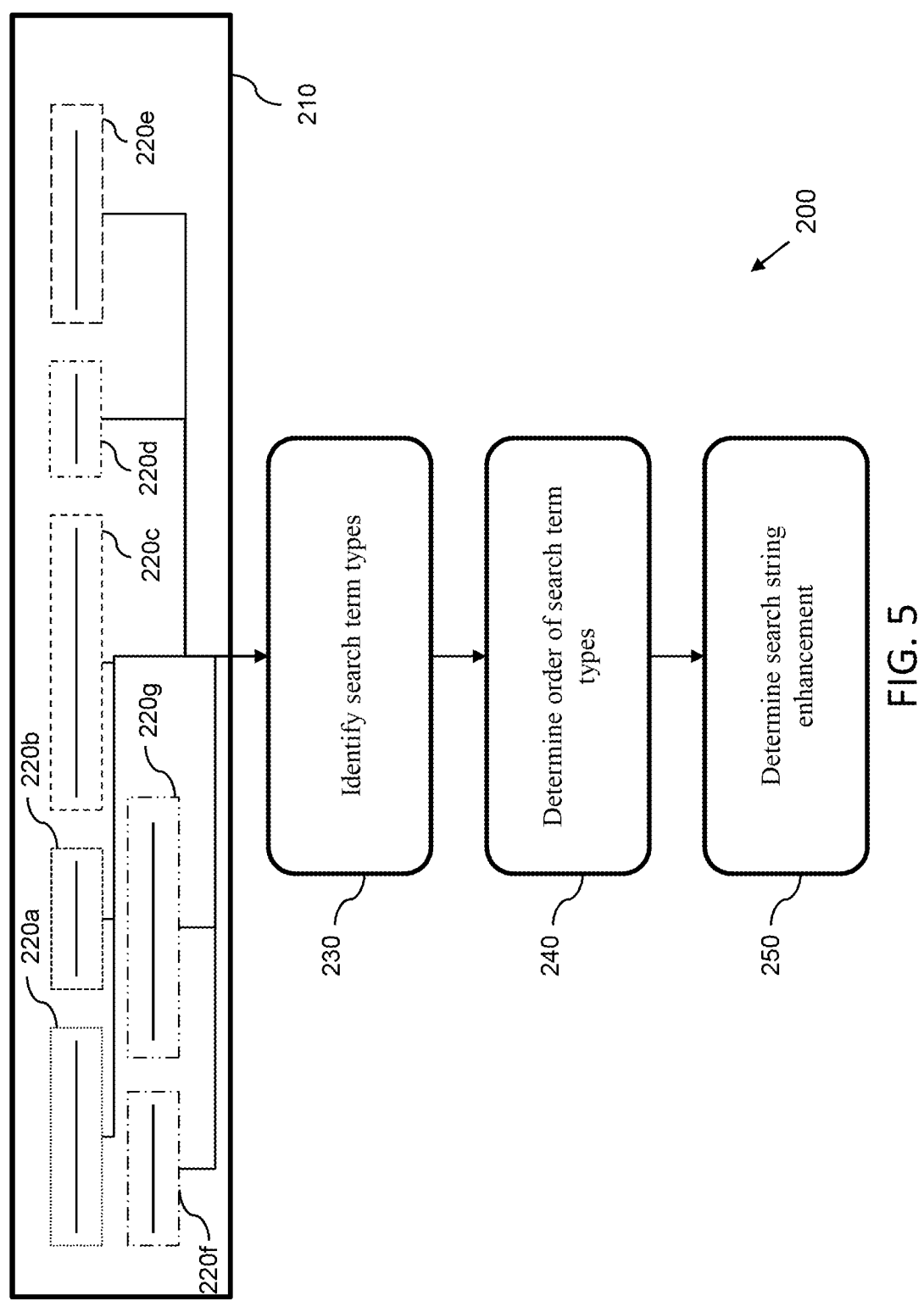
FIG. 5 depicts a simplified schematic representation of an example method for determining an enhancement for a search string, in accordance with embodiments of the present disclosure.

FIG. 5 depicts a simplified schematic representation of a method 200 for determining an enhancement for a search string according to an aspect of the disclosure.

In the example shown in FIG. 5, an input search string 210 comprising a plurality of search terms (220*a*, 220*b*, 220*c*, 220*d*, 220*e*, 220*f*, and 220*g*) is received at an input field. The input field may be any input field linked to a searching mechanism. For example, the input field may form part of a search engine user interface where a user can enter a search string.

At operation 230 of the method 200, a type of each of the one or more search terms is identified. For example, the type (e.g., part of speech) of the one or more search terms may comprise one or more of a noun, an adjective, a verb, and an adverb. In other words, the input search string may comprise one or more nouns, adjectives, verbs, and/or adverbs that are identified by the method. The number of types may depend on the language, and, in some languages, the type may further include the subtype (e.g., class or category). For example, Japanese has multiple classes of adjectives, and the type of a Japanese search term may include the specific class of adjective.

At operation 240 of the method 200, an order of the types of the one or more search terms in the input search string is determined, and at operation 250, an enhancement for the input search string is determined based on the determined order of the types of the one or more search terms. In the illustrative example shown in FIG. 5, the search terms are in the order 220*a*, 220*b*, 220*c*, 220*d*, 220*e*, 220*f*, 220*g*. However, in accordance with at least one embodiment of the present disclosure, each search term may be either an adjective or a noun. For example, search terms 220*a* to 220*f* may be adjectives describing search term 220*g*, which may be a noun. Alternatively, the search terms 220*a* to 220*g* may be a random mixture of nouns and adjectives.

As discussed above, the ordering of the terms in a search string, and in particular the ordering of the types of search terms within a search string, can significantly alter the intended meaning of the search string. By determining an enhancement for a search string based on the ordering of the types of search terms within the search string, the determined enhancement may take into account the intent behind the search string with greater accuracy, thereby resulting in more accurate and relevant search results.

The methods described herein may be adapted to function for any language and the subtlety in the ordering of words may be specific to each language. For example, in English, adjectives describing a noun are usually placed before the noun; whereas, in languages such as Spanish, adjectives describing a noun are placed after the noun. When using multiple adjectives to describe a noun in English, there is a natural ordering that makes sense and how we would naturally describe the object, according to the grammatical rules of the language. While there can be slight variation in the ordering, in general, adjectives in English may follow the following order of adjective types: opinion (such as excellent, poor, lovely); size (such as big, small, large, tiny); physical quality (such as shiny, dusty, worn, mint); shape (such as round, square, rectangular); age (such as old, new, ancient); color (such as red, blue, yellow); origin (such as English, Irish, Italian, French); material (such as metal, wood, woolen, stone); type (such as general-purpose, four-sided, U-shaped); and purpose (such as carving, sewing, cutting, cooking).

By taking the ordering of the search terms, and in particular, the ordering of the types of search terms within the search string, into account, a search engine may be adapted to differentiate between a user's search for a random string of words and a user's search for something very specific that makes sense to them using the language rules for noun and adjective ordering.

By way of example, if a user were to search using the search string "the lovely big old long red Scottish metal carving knife," the search engine may be adapted to determine from the ordering of the search terms that the user is searching for a knife with those very specific properties. Accordingly, the search results reflect that intent and only show pages, or prioritize pages, where a knife of that nature is described.

In contrast, if the user were to search using the search string "the Scottish knife carving," the search engine may be adapted to determine from the ordering of the search terms that the user is interested in a carving made with a Scottish knife. Accordingly, the search results reflect that intent and show, or prioritize, pages in which a carving made with a knife of that nature is described.

Further, if the user were to search using the search string "the knife Scottish long metal carving lovely old big red," the search engine may be adapted to determine that this search string does not follow any adjective ordering rule or the adjectives before nouns rule, that it is not a description of a knife, and therefore the search engine provides all results that include all of those words in any order throughout their pages.

Examples of enhancements that may be provided to the search string based on the determined order of the search terms in the search string are discussed in further detail below.

If the input search string comprises only a noun, or a plurality of nouns, the search engine may determine that no enhancement is required for the input search string. For example, if a user enters the search string "dog", then the search engine may determine that the user intends to perform a broad search with no need for a given specific characteristic. Accordingly, the search engine may simply proceed to search for the term "dog" and return the results to the user.

However, responsive to identifying one or more of the search terms in the search string as an adjective, the method may further include identifying a category of each adjective, determining an order of the categories of each adjective in the input search string, and determining an enhancement for the input search string based on the determined order of the categories of the one or more search terms.

As described above, there exist multiple different categories of adjectives which are typically organized according to certain ordering rules when being used to describe a noun. The orderings of the categories of the adjectives entered by the user in the search string may be taken into account by the search engine when performing searches in order to get the most accurate search results for the user.

In particular, the search engine may be adapted to compare the determined order of the categories of the one or more adjectives to a grammatical rule. Determining the enhancement for the input string may then be based on the comparison of the determined order of the categories of the one or more adjectives to the grammatical rule.

For example, when a user enters a string of words containing a set of adjectives followed by a noun, the search engine may examine the meanings of the adjectives to determine if the search terms in the search string follows, or roughly follows, the adjective ordering rule.

If the adjective ordering rule is not obeyed, then the search engine may determine that the user intends to search for results containing those words, in any order, spread throughout the page. In this case, the search may proceed as normal. An example of a search string that may not obey the adjective ordering rule may be "big dog red," which may return webpages about big red dogs, big dogs with red collars, and small dogs with big red ears. In other words, in this case, the search string is not enhanced, and the search may be permitted to proceed without further interaction by the search engine.

Alternatively, responsive to the determined order of the categories of one or more adjectives not satisfying the grammatical rule, determining the enhancement for the input search string may comprise determining whether a part of the determined order of the categories of one or more adjectives satisfies the grammatical rule and, for any part of the determined order of the categories of one or more adjectives that does satisfy the grammatical rule, grouping said one or more adjectives into a search group. An AND operator may then be provided between the search group and the remaining one or more adjectives. In the example given above, the search group would comprise "big dog" and the remaining adjective would be "red", meaning that the enhanced search string may become "big dog AND red", which may return results about big dogs that are red, big dogs with red collars, but would exclude small dogs from the search results.

If the search engine determines that the grammatical rule (for example, the adjective ordering rule) is obeyed, then the search engine may determine that the user is trying to search for something very specific. Accordingly, in such instances, the enhanced search string may be adapted to reflect that the search terms must be contained together and in the correct order specified by the user. In the example given above, the enhanced search string may take the form "big+*+red+*+dog." The asterisks may be included as wildcard operators to allow additional words to be included in the search results, whilst maintaining the ordering of the search terms in the input search string. For example, the enhanced search string may also return results about big red friendly dogs or big fluffy red dogs. Accordingly, the user may receive a wider array of search results that are all highly relevant to the input search string, thereby improving the scope of the search engine without diluting the search results with less relevant results.

By way of an illustrative example, the methods of the disclosure may operate as follows. A user inputs a search string containing one or more search terms to a search engine. The search engine analyzes the search string, and a noun is detected with multiple adjectives preceding it. As discussed above, if only a noun is detected, the search simply proceeds as normal without further enhancement.

The list of adjectives in the search string is converted into 'types of adjectives,' for example using the categories: opinion, size, physical, quality, shape, age, color, origin, material, type, and purpose. In some case, a natural language processing algorithm may be trained and used for this purpose. The ordering of the adjective types is then compared with an expected order of adjectives according to a grammatical rule of the given language of the search string. If the order of the types of search terms, and the order of the types of adjectives, match the appropriate grammatical rule, then the search engine determines that the user is searching for the noun with those specific adjectives. In such instances, the enhanced search string may be constructed as "adjective1+*+adjective2+*+adjective3+ . . . +noun," so that only results containing the noun described by those specific adjectives are returned. If the order of the search terms, and/or the order of the types of adjectives, does not match the appropriate grammatical rule, then the search engine determines that the search terms were entered in a non-specific order, and the enhanced search string may be constructed as "word1"+"word2"+"word3"+ . . . +"wordN", so that all search results containing those words in any order are returned.

When the enhanced search string has been determined, any remaining rules specific to the given search engine are applied and the search results is then returned to the user.

In accordance with at least one embodiment of the present disclosure, the methods described above may be performed by way of a machine learning algorithm, such as a natural language processing algorithm. The training and deployment of a machine learning algorithm for performing the methods described above is described in further detail below.

Figure 6:
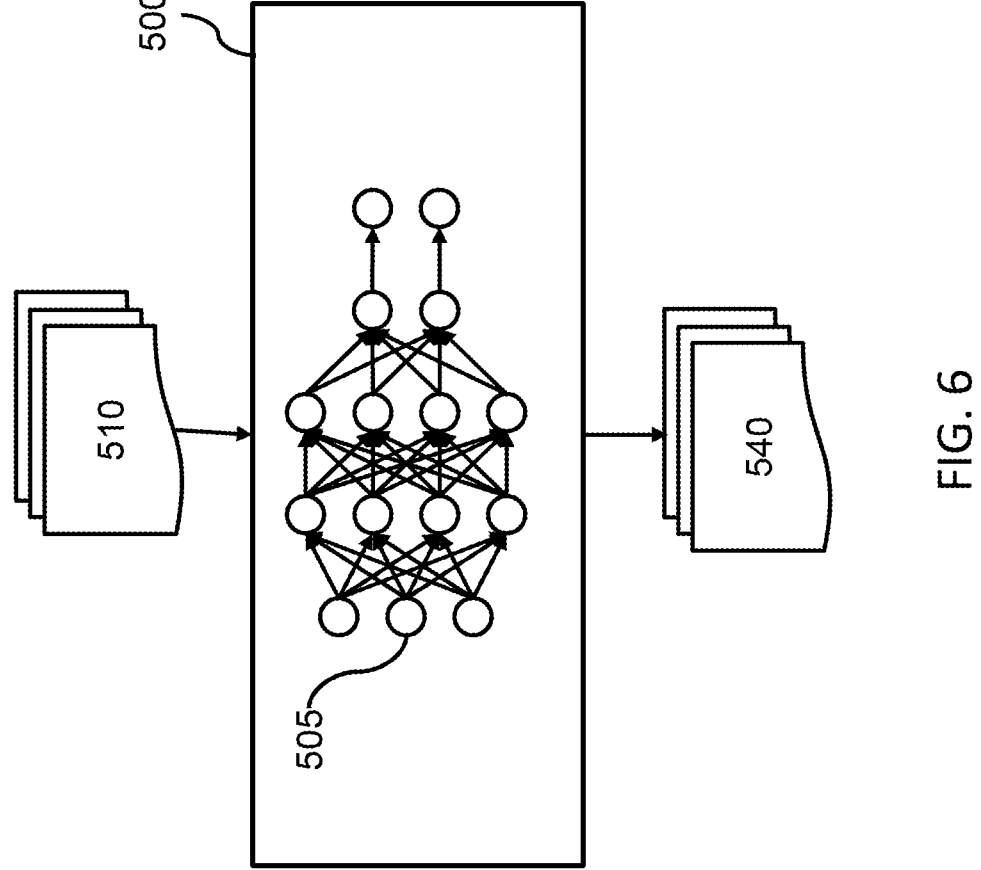
FIG. 6 depicts simplified diagrams illustrative of an example of training a machine learning algorithm for determining an enhancement for a search string, in accordance with embodiments of the present disclosure.

FIG. 6 illustrates an example of training a machine learning algorithm for determining an enhancement for an input search string according to an embodiment. The example embodiment of FIG. 6 may be implemented in the environment of FIGS. 1 and 4, for example. As noted above, the flowchart(s) illustrate the architecture, functionality, and operation of possible implementations of systems, methods, and computer program products as already described herein in accordance with the various embodiments of the present disclosure. The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in each block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 6, there is depicted simplified diagram representing training a machine learning algorithm, according to an embodiment. Here, the machine-learning algorithm employs an artificial neural network 500.

The structure of an artificial neural network (or, simply, neural network) is inspired by the human brain. Neural networks are comprised of layers, each layer comprising a plurality of neurons 505. Each neuron comprises a mathematical operation. In particular, each neuron may comprise a different weighted combination of a single type of transformation. In other words, for example, more than one neuron may comprise the same type of transformation, sigmoid, etc. but each with different weightings. In the process of processing input data, the mathematical operation of each neuron is performed on the input data to produce a numerical output, and the outputs of each layer in the neural network are fed into the next layer sequentially. The final layer provides the output.

There are several types of neural network, such as convolutional neural networks (CNNs) and recurrent neural networks (RNNs). Embodiments of the present disclosure employ a CNN-based learning algorithm, by way of illustrative example. CNNs typically contain several layers, including a convolutional layer, a pooling layer, a fully connected layer and a softmax layer. The convolutional layer consists of a set of learnable filters and extracts features from the input. The pooling layer is a form of non-linear downsampling, reducing the data size by combining the outputs of a plurality of neurons in one layer into a single neuron in the next layer. The fully connected layer connects each neuron in one layer to all the neurons in the next layer. The softmax layer determines a probability distribution for each output.

Various approaches to training a machine-learning algorithm are known. Typically, such methods comprise obtaining a training dataset, comprising training input data entries 510 and corresponding training output data entries 540. An initialized machine-learning algorithm is applied to each input data entry 510 to generate predicted output data entries. An error between the predicted output data entries and corresponding training output data entries is used to modify the machine-learning algorithm. This process can be repeated until the error converges, and the predicted output data entries are sufficiently similar (e.g., ±1%) to the training output data entries. This is commonly known as a supervised learning technique.

For example, weightings of the mathematical operation of each neuron 505 may be modified until the error converges. Known methods of modifying a neural network include gradient descent, backpropagation algorithms, and so on.

The training input data entries for the machine learning algorithm, according to at least one embodiment disclosed herein, correspond to training search strings having multiple search terms and multiple search term types. By way of example, a description of a training incident may comprise: a noun and one or more adjectives, wherein the one or more adjectives may or may not satisfy a grammatical rule.

The training output data entries for the machine learning algorithm, according to at least one embodiment disclosed herein, correspond to training enhancements for the training search strings based on the order of the types of search terms.

Several pre-processing methods may be employed to improve the training sample. For instance, the data sources to be used to provide a dataset to train the machine learning algorithm, according to at least one embodiment disclosed herein, may have differentiating formats. Therefore, some pre-processing may be executed to bring all training data to a common format. For this, a data pre-processor component may be used. In such embodiments, all data that is used to train the machine learning algorithm model may be passed through the data pre-processor component to achieve a consistent format of the training data.

The data format may be configured to preserve the relationship(s) between: (i) a search string (or a set of search strings); and (ii) an enhancement to the search string(s). In a simple form, the data may be represented as tuples of a search string and an enhancement—for example, (string1, enhancementA), ([string2, string3], enhancementB), etc.

The training data may either be provided by an initial data set (for example, training data) or data incoming from a search engine deployment at an edge computing environment. The initial data set may be split into a training data set and a test data set, to provide validation for the training process.

From the above description, it will be understood that embodiments propose training a machine learning algorithm based on a training search string (as a training input for the machine learning algorithm) and the appropriate enhancement for the training search string (as a training output for the machine learning algorithm).

Figure 7:
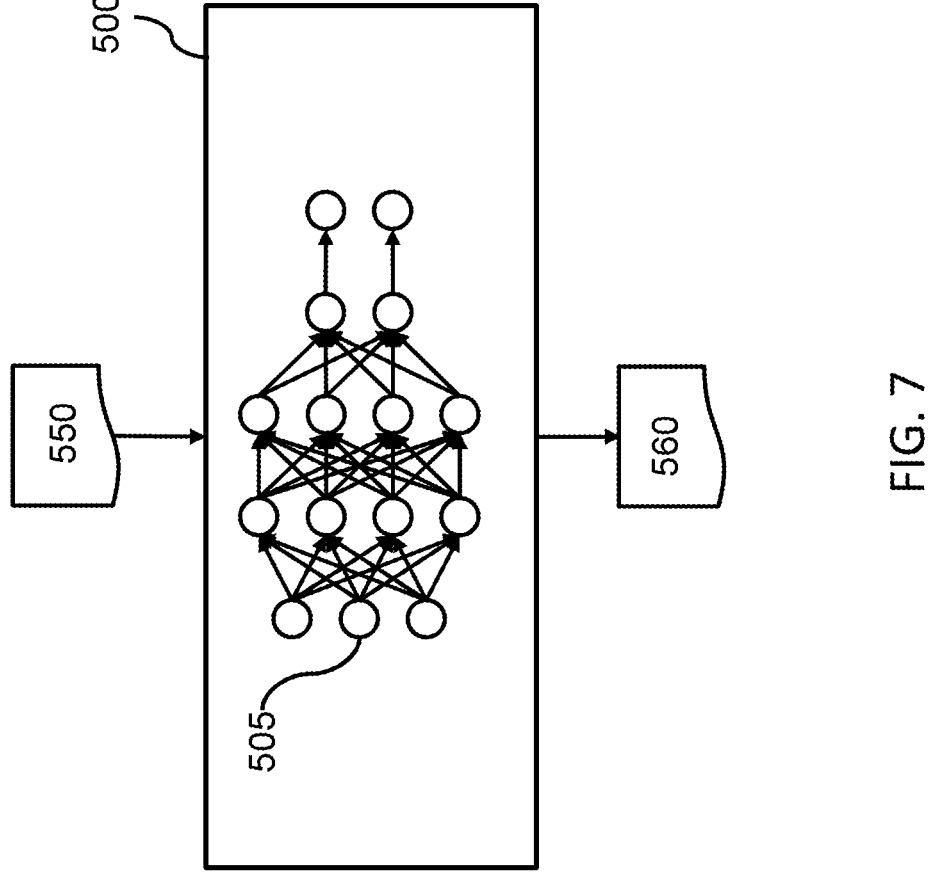
FIG. 7 depicts an illustrative example of how the machine learning algorithm trained in FIG. 6 may be used for search string enhancement, in accordance with embodiments of the present disclosure.

FIG. 7 is a simplified illustration depicting an example of how the machine learning algorithm trained in FIG. 6 may be used for search string enhancement according to an embodiment of the present disclosure.

According to the illustrative example, when a new search string is entered into an input field of a search engine, the new search string 550 is provided as an input to the artificial neural network 500. A prediction result 560 is then obtained as an output from the artificial neural network 500, wherein the prediction result 560 includes an enhancement to be provided to the search string. An enhanced search string may then be generated and used to obtain the search results to be provided to the user.

As illustrated in the previous description, and understood by those of skill in the art, in embodiments of the present disclosure, the machine-learning concepts disclosed herein provide numerous advantages over conventional search string enhancement approaches. These advantages include, but are not limited to, efficient and accurate identification of enhancements for a search string input by the user. In embodiments of the present disclosure, this technical solution is accomplished by training/employing a machine learning algorithm/model.

As a further advantage in response to a technical problem, the systems and processes described herein provide a computer-implemented method for efficient search string enhancement, which may be provided on (or via) a distributed communication network. In such instances, a computer infrastructure, such as the computer system shown in FIGS. 1 and 4, or the cloud environment shown in FIG. 2, can be provided, and one or more systems for performing the processes of the disclosure can be obtained (e.g., created, purchased, used, modified, etc.) and deployed to the computer infrastructure. To this extent, the deployment of a system can comprise one or more of:

(i) installing program code on a computing device, such as the computer system shown in FIG. 1, from a computer-readable medium;

(ii) adding one or more computing devices to the computer infrastructure, and more specifically the cloud environment; and (iii) incorporating and/or modifying one or more existing systems of the computer infrastructure to enable the computer infrastructure to perform the processes of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining an enhancement for an input search string, the computer-implemented method comprising:

responsive to receiving the input search string comprising one or more search terms at an input field:

identifying a type of each of the one or more search terms, wherein a first type of a first search term is a noun and a second type of a second search term is an adjective;

determining an intent of a user providing the input search string based on an order of the types of the one or more search terms in the input search string;

comparing the order to one or more grammatical rules;

determining the enhancement for the input search string based on the determined intent of the user and on the comparing in order to obtain relevant search results;

responsive to identifying the type of the one or more search terms as one or more adjectives:

identifying a category of each of the one or more adjectives;

determining an order of the categories of the one or more adjectives;

training a machine learning algorithm to predict the enhancement to the input search string based on a predetermined order of the one or more search terms; and after the training, using the machine learning algorithm to determine the enhancement for the input search string based on the determined order of the categories of the one or more adjectives, wherein the enhancement for the input search string based on the determined order is adapted to enhance an accuracy of the input search string and an improvement of the relevant search results, and wherein the enhancement includes the one or more search terms included in the input search string and reflects the intent of the user;

and providing the enhancement to the input field automatically on behalf of the user.

2. The computer-implemented method of claim 1, further comprising:

comparing the determined order of the categories of the one or more adjectives to a grammatical rule, wherein determining the enhancement for the input search string is further based on the comparing.

3. The computer-implemented method of claim 2, wherein when the determined order of the categories of the one or more adjectives does not satisfy the grammatical rule, determining the enhancement for the input search string comprises:

determining that no enhancement is required for the input search string.

4. The computer-implemented method of claim 2, wherein when the determined order of the categories of the one or more adjectives does not satisfy the grammatical rule, determining the enhancement for the input search string comprises:

determining that a part of the determined order of the categories of the one or more adjectives satisfies the grammatical rule;

for the part of the determined order of the categories, grouping the one or more adjectives into a search group; and providing an AND operator between the search group and remaining one or more adjectives that are not included in the part of the determined order.

5. The computer-implemented method of claim 2, wherein when the determined order of the categories of the one or more adjectives satisfies the grammatical rule, determining the enhancement for the input search string comprises:

generating wildcard operators to be provided between the one or more adjectives.

6. The computer-implemented method of claim 1, wherein when the input search string comprises only a noun, determining the enhancement for the input search string comprises:

determining that no enhancement is required for the input search string.

7. The computer-implemented method of claim 1, further comprising:

generating an enhanced search string based on the enhancement.

8. The computer-implemented method of claim 7, further comprising:

providing the enhanced search string to the input field.

9. The computer-implemented method of claim 1, wherein the method is performed by the machine learning algorithm.

10. The computer-implemented method of claim 9, wherein the machine learning algorithm comprises a natural language processing algorithm.

11. A method for training a machine learning algorithm for determining an enhancement to an input search string, the method comprising:

receiving: i) a training search string having multiple search terms and multiple search term types, wherein a first type of a first search term is a noun and a second type of a second search term is an adjective; and ii) a training enhancement for the training search string based on a predetermined order of types of the multiple search terms, wherein the predetermined order of the types of the multiple search terms is determined by an intent of a user providing the input search string, the training enhancement for the input search string reflects the intent of the user, and the training enhancement includes the multiple search terms included in the training search string;

training the machine learning algorithm to predict the enhancement to the input search string based on the predetermined order of the multiple search terms and based on the training search string as a training input for the machine learning algorithm and the training enhancement for the training search string as a training output for the machine learning algorithm;

receiving: i) a further training search string having multiple adjectives comprising multiple categories of the adjectives; and ii) a further training enhancement for the further training search string based on a predetermined order of the categories of the adjectives; and training the machine learning algorithm based on the further training search string as the training input for the machine learning algorithm and the further training enhancement for the training search string as the training output for the machine learning algorithm.

12. A computer program product for determining an enhancement for a search string, the computer program product comprising a computer readable storage medium having program instructions embodied therewith, the program instructions executable by a processing unit to cause the processing unit to perform a method, the method comprising:

responsive to receiving an input search string comprising one or more search terms at an input field:

identifying a type of each of the one or more search terms, wherein a first type of a first search term is a noun and a second type of a second search term is an adjective;

determining an intent of a user providing the input search string based on an order of the type of the one or more search terms in the input search string;

comparing the order to one or more grammatical rules;

determining an enhancement for the input search string based on the intent of the user and on the comparing in order to obtain relevant search results, wherein the enhancement includes the one or more search terms included in the input search string;

responsive to identifying the type of the one or more of the search terms as one or more adjectives:

identifying a category of each of the one or more adjectives;

determining an order of the categories of the one or more adjectives;

training a machine learning algorithm to predict the enhancement to the input search string based on a predetermined order of the one or more search terms; and after the training, using the machine learning algorithm to determine the enhancement for the input search string based on the determined order of the categories of the one or more search terms, wherein the enhancement for the input search string based on the determined order is adapted to enhance an accuracy of the input search string and an improvement of the relevant search results; and providing the enhancement to the input field automatically on behalf of the user.

13. The computer program product of claim 12, wherein the method further comprises:

comparing the determined order of the categories of the one or more adjectives to a grammatical rule, wherein the determining the enhancement for the input string is further based on the comparing.

14. The computer program product of claim 13, wherein when the determined order of the categories of the one or more adjectives does not satisfy the grammatical rule, determining the enhancement for the input search string comprises:

determining that a part of the determined order of the categories of the one or more adjectives satisfies the grammatical rule;

for the part of the determined order of the categories, grouping the one or more adjectives into a search group; and providing an AND operator between the search group and remaining one or more adjectives that are not included in the part of the determined order.

15. The computer program product of claim 13, wherein when the determined order of the categories of the one or more adjectives satisfies the grammatical rule, determining the enhancement for the input search string comprises:

generating wildcard operators to be provided between the one or more adjectives.

\* \* \* \* \*